United States Patent
Qu et al.

(10) Patent No.: US 9,396,375 B2
(45) Date of Patent: *Jul. 19, 2016

(54) MULTIPLE PLATFORM SUPPORT SYSTEM AND METHOD

(71) Applicant: Hand Held Products, Inc., Fort Mill, SC (US)

(72) Inventors: Huyu Qu, Cupertino, CA (US); Ynjiun Paul Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,822

(22) Filed: Apr. 15, 2015

(65) Prior Publication Data

US 2016/0026839 A1 Jan. 28, 2016

Related U.S. Application Data

(63) Continuation of application No. 12/961,961, filed on Dec. 7, 2010, now Pat. No. 9,010,641.

(51) Int. Cl.
*G06K 7/10* (2006.01)
*G06F 9/455* (2006.01)
*G06F 17/30* (2006.01)

(52) U.S. Cl.
CPC ........ *G06K 7/10851* (2013.01); *G06F 9/45537* (2013.01); *G06F 9/45558* (2013.01);
(Continued)

(58) Field of Classification Search
CPC ............ G06F 1/1632; G06F 17/30879; G06F 1/1626; G06F 1/1656; G06F 1/1684; G06F 2009/45566; G06F 3/002; G06F 3/0481; G06F 9/44505; G06F 9/45558; H04N 21/4113; H04N 21/21; H04N 21/23; H04N 21/4131
USPC .............. 235/462.01-462.48, 472.01-472.03
See application file for complete search history.

(56) References Cited

U.S. PATENT DOCUMENTS

| | | | | |
|---|---|---|---|---|
| 5,481,684 A | * | 1/1996 | Richter | G06F 9/30145 703/26 |
| 5,896,523 A | * | 4/1999 | Bissett | G06F 9/3851 713/375 |

(Continued)

FOREIGN PATENT DOCUMENTS

| | | |
|---|---|---|
| CN | 101149685 A | 3/2008 |
| CN | 101410818 A | 4/2009 |

(Continued)

OTHER PUBLICATIONS

Cygwin User's Guide, found at http://www.cygwin.com/cygwin-ug-net.html, printed on Aug. 11, 2011. Previously submitted in Parent Application.

(Continued)

*Primary Examiner* — Thien M Le
(74) *Attorney, Agent, or Firm* — Additon, Higgins, & Pendleton, P.A.

(57) ABSTRACT

A portable data terminal including a processor having an instruction set architecture and data storage means configured to store a plurality of operating systems and a virtual machine monitor application program configured to receive at least one instruction from each operating system, communicate with the processor according to the instruction set architecture, and switch operating system access to the processor upon receipt of an electrical signal representing an event.

20 Claims, 5 Drawing Sheets

(52) U.S. Cl.
CPC ...... *G06F17/30879* (2013.01); *G06K 7/10584* (2013.01); *G06K 7/10732* (2013.01); *G06F 2009/45579* (2013.01)

(56) References Cited

U.S. PATENT DOCUMENTS

| | | | |
|---|---|---|---|
| 6,496,847 | B1 | 12/2002 | Bugnion et al. |
| 6,615,366 | B1* | 9/2003 | Grochowski ........ G06F 9/30076 712/1 |
| 7,162,629 | B2 | 1/2007 | Zimmer et al. |
| 7,356,677 | B1 | 4/2008 | Rafizadeh |
| 7,407,107 | B2 | 8/2008 | Engestrom et al. |
| 7,424,601 | B2 | 9/2008 | Xu |
| 7,523,455 | B2* | 4/2009 | Morris ................ G06F 9/3851 712/228 |
| 7,665,088 | B1 | 2/2010 | Bugnion et al. |
| 7,702,828 | B2 | 4/2010 | Fujimoto et al. |
| 8,433,889 | B2* | 4/2013 | Princen ............... G06F 9/45533 713/1 |
| 9,010,641 | B2* | 4/2015 | Qu ...................... G06F 9/45537 235/462.15 |
| 2001/0018717 | A1 | 8/2001 | Shimotono |
| 2003/0001018 | A1 | 1/2003 | Hussey et al. |
| 2003/0192950 | A1 | 10/2003 | Muterspaugh |
| 2004/0089720 | A1 | 5/2004 | Barkan et al. |
| 2005/0235045 | A1 | 10/2005 | Narayanaswami et al. |
| 2006/0010314 | A1 | 1/2006 | Xu |
| 2007/0033260 | A1 | 2/2007 | Grouzdev et al. |
| 2007/0078891 | A1 | 4/2007 | Lescouet et al. |
| 2008/0189538 | A1 | 8/2008 | King et al. |
| 2009/0063845 | A1 | 3/2009 | Lin |
| 2009/0113423 | A1 | 4/2009 | Hiltgen et al. |
| 2009/0172384 | A1 | 7/2009 | Anson |
| 2009/0173778 | A1 | 7/2009 | Cummings et al. |
| 2010/0017806 | A1 | 1/2010 | Maslov |
| 2010/0122077 | A1 | 5/2010 | Durham |
| 2011/0213993 | A1* | 9/2011 | Greenhalgh .......... G06F 1/3203 713/320 |
| 2011/0238506 | A1 | 9/2011 | Perkowski et al. |
| 2011/0256905 | A1 | 10/2011 | Ryan |
| 2011/0271088 | A1* | 11/2011 | Princen ............... G06F 9/45533 713/2 |
| 2012/0235572 | A1* | 9/2012 | Deckard ............ H05B 37/0245 315/130 |
| 2012/0246370 | A1 | 9/2012 | Zhang |

FOREIGN PATENT DOCUMENTS

| | | |
|---|---|---|
| CN | 101782861 A | 7/2010 |
| EP | 1630670 A2 | 3/2006 |
| JP | 2007-220086 A | 8/2007 |
| WO | 2008/017489 A1 | 2/2008 |

OTHER PUBLICATIONS

Featured VMware Documentation Sets, found at http://www.vmware.com/support/pubs, printed on Aug. 11, 2011. Previously submitted in Parent Application.

Apr. 4, 2012 European Search Report in European Application No. 11192029.4. Previously submitted in Parent Application.

Feb. 2, 2013 Communication pursuant to Article 94(3) EPC in European Application No. 11192029.4. Previously submitted in Parent Application.

Office Action in European Application No. 11192029.4, dated Jul. 10, 2013, 4 pages. Previously submitted in Parent Application.

Office Action in counterpart Chinese Application No. 201110462509.4 dated Oct. 9, 2015, pp. 1-7.

English-translation of Office Action in counterpart Chinese Application No. 201110462509.4 dated Oct. 9, 2015, pp. 1-12.

Office Action in counterpart Japanese Application No. 2011-266750 dated Sep. 16, 2015, pp. 1-2.

English-translation of Office Action in counterpart Japanese Application No. 2011-266750 dated Sep. 16, 2015, pp. 1-3.

* cited by examiner

MULTIPLE PLATFORM SUPPORT SYSTEM AND METHOD

CROSS-REFERENCE TO RELATED APPLICATION

The present application claims the benefit of U.S. patent application Ser. No. 12/961,961 for a Multiple Platform Support System and Method filed Dec. 7, 2010 (and published Jun. 7, 2012 as U.S. Patent Application Publication No. 2012/0138685), now U.S. Pat. No. 9,010,641. Each of the foregoing patent application, patent publication, and patent is hereby incorporated by reference in its entirety.

TECHNICAL FIELD

The present invention relates to portable data terminals and more particularly, to portable data terminals capable of supporting multiple platforms.

BACKGROUND

Remote devices such as portable data terminals, optical and laser indicia readers, bar code scanners, and other mobile computers, for example, typically read data represented by printed indicia such as symbols, symbology, and bar codes, for example. One type of symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light. One-dimensional (1D) optical bar code readers are characterized by reading data that is encoded along a single axis, in the widths of bars and spaces, so that such symbols can be read from a single scan along that axis, provided that the symbol is imaged with sufficiently high resolution.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation, and reference structures.

Many other classes of bar code symbologies and/or indicia have been known and are in widespread use including, for example, PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, OCR-A, OCR-B, Code 11, UPC, EAN, MSI, and Code 16K. Further, indicia may be represented by printed indicia, symbol indicia, biogenic/biometric indicia or any information extracted from a captured image.

Conventionally, a bar code reader, whether portable or otherwise, includes a central processor which directly controls the operations of the various electrical components housed within the reader. For example, the central processor controls detection of keypad entries, display features, wireless network communication functions, trigger detection, and bar code read and decode functionality. More specifically, the central processor typically communicates with an illumination assembly configured to illuminate a target, such as a bar code, and an imaging assembly configured to receive an image of the target and generate an electric output signal indicative of the data optically encoded therein. The output signal is then converted by an analog to digital converter and analyzed by algorithms stored in memory to decode any barcode contained in the captured image. Further, the central processor often controls a network interface configured to communicate over a wireless or wired network with a host server.

Increasingly, traditionally less dominant operating systems such as Linux, for example, have gained popularity for various reasons including power consumption/management, relative ease of use, and software application program offerings, among others. However, device manufacturers, particularly those of portable, mobile, and embedded devices, have often created device drivers (software that facilitates computing system communication with a hardware device) configured to operate on traditionally more dominant operating systems such as Windows Mobile, for example. For example, bar code scanners generally have embedded drivers for facilitating scanner communication and control of imaging and/or illumination assemblies for acquiring pixel data that, when decoded, represents the value encoded in the bar code. Creating a plurality of device drivers each configured to operate on a respective operating system would require substantial resources in terms of cost and time to develop as well as ongoing manufacturer support and maintenance of the various drivers.

Accordingly, there is a need for a portable data terminal configured to efficiently and conveniently supporting at least two platforms thereby reducing the need for portability of one or more device drivers and/or other software application programs.

BRIEF DESCRIPTION OF THE DRAWINGS

The present invention is disclosed with reference to the accompanying drawings, wherein.

Figure 1A:
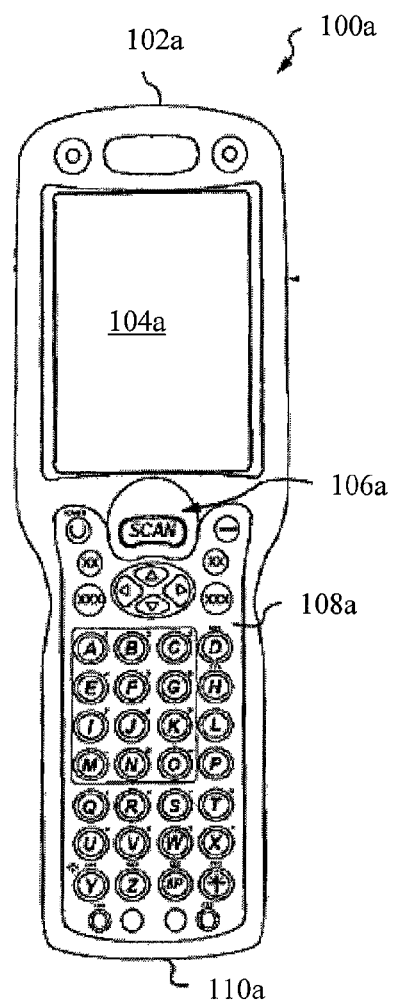
FIGS. 1A and 1B are perspective views of exemplary portable data terminals according to the present invention.

It will be appreciated that for purposes of clarity and, where deemed appropriate, reference numerals have been repeated in the figures to indicate corresponding features.

DETAILED DESCRIPTION

Figure 1B:
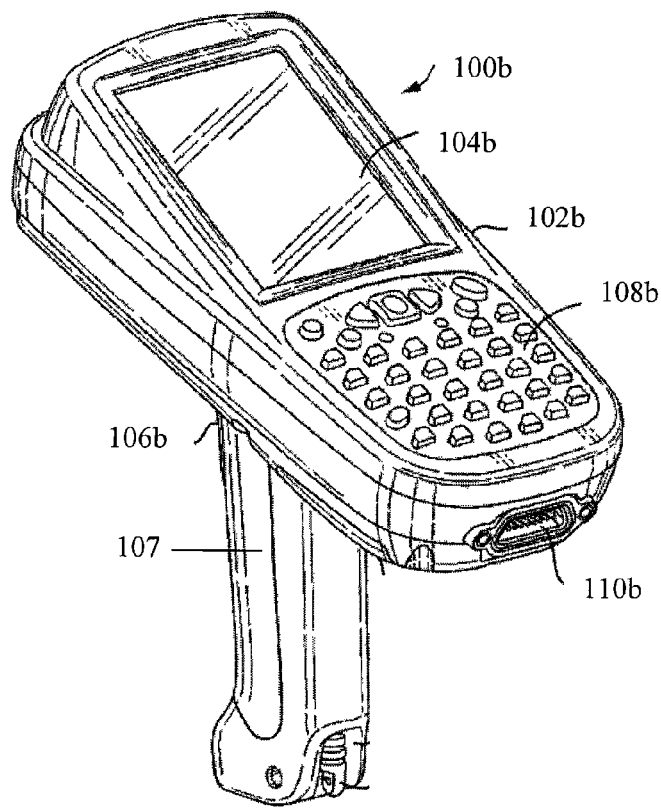

Referring to FIGS. 1A and 1B, two exemplary portable data terminals (PDTs) 100 for reading/scanning printed indicia are shown. Although the present invention is described with respect to a PDT, the invention can be utilized in any bar code scanner, mobile electronic device, mobile computer, or personal data assistant, for example. The PDT housing 102 can be shaped so as to fit into a human hand using a handle portion 107 and can include a user interface device such as a finger actuatable scan/capture or trigger button 106 as well as a keypad 108 for inputting data and commands, power button, and antenna for facilitating communication with a local or remote host processor, for example. The PDT 100 also includes a display 104, such as an LCD or OLED display, for example, for displaying information to the user. If the display 104 is a touch screen, a stylus (not shown) may also be included to facilitate interaction with the touch screen. An aperture in the housing 102 is included such that illumination and imaging optics have substantially unobstructed access to a target. The PDT 100 can also include a power port for receiving a power supply, one or more communication ports for facilitating wired or wireless communication with a network interface and/or both functions can be provided by the same port 110.

Figure 2A:
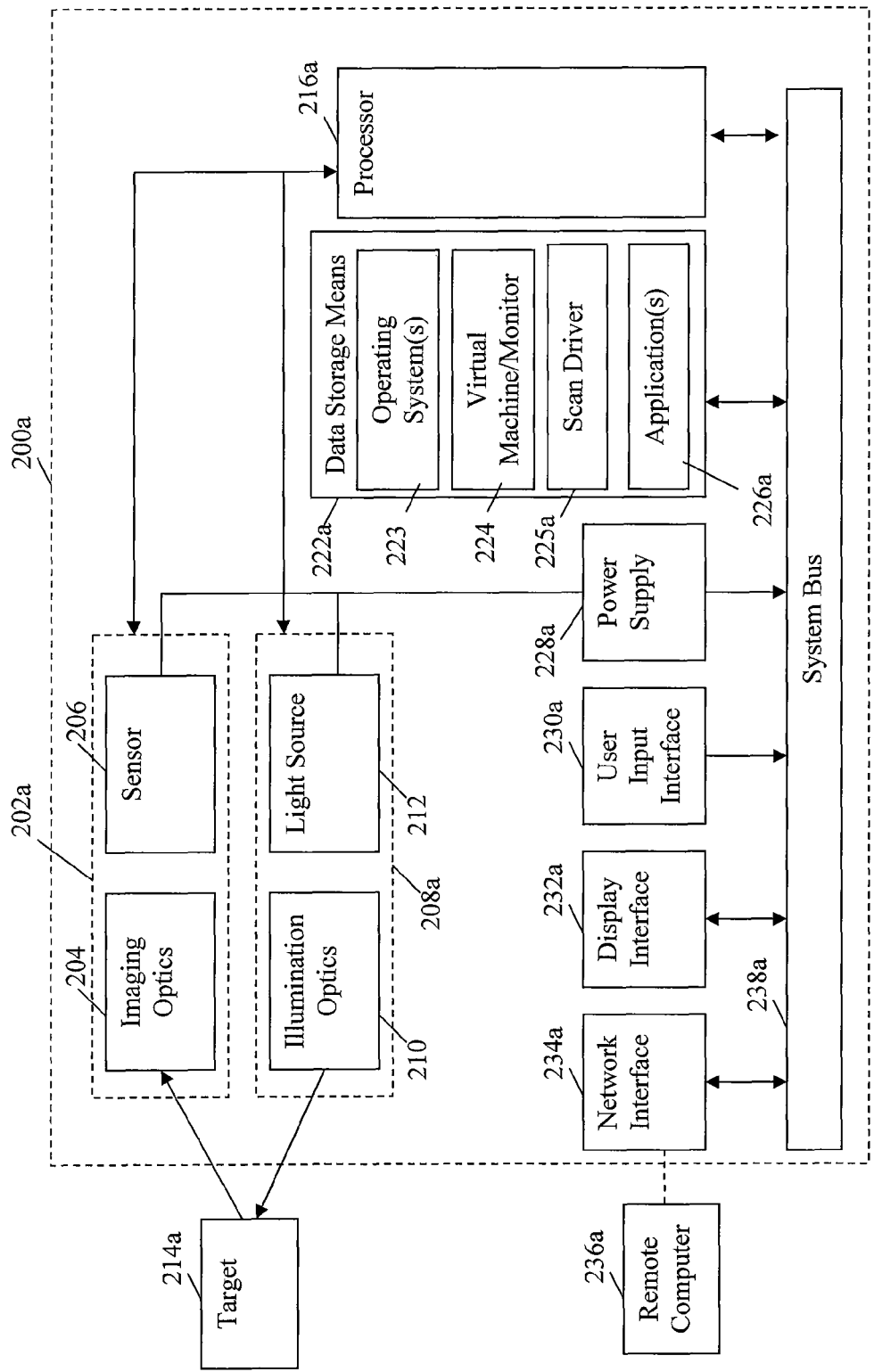
FIGS. 2a and 2b are block diagrams of an exemplary portable data terminal including an illumination and laser imaging assembly, respectively, according to the present invention.

Referring to FIG. 2a, there is shown a block schematic diagram of the basic structures that together comprise a PDT 200a according to the present invention. The PDT 200a includes an illumination assembly 208a for illuminating a target 214a, such as a bar code, and an imaging assembly 202a for receiving an image of the target 214a and generating an electric output signal indicative of the pixel data optically encoded therein. The illumination assembly 208a includes at least one light source 212 together with illumination optics 210, such as one or more reflectors, for directing light from the light source 212 in the direction of the target 214a. The light source 212 includes at least one LED configured to emit light in the near-infrared range and/or at least one LED configured to emit light in the visible range, for example. The imaging assembly 202a includes a 2D sensor 206, such as a CCD, CMOS, NMOS, PMOS, CID, or CMD solid state image sensor along with imaging optics 204 for receiving and focusing an image of the target 214a onto the sensor 206.

Still referring to FIG. 2a, the PDT 200a further includes a processor 216a, such as a microprocessor, VLSI, ASIC and/or other integrated circuit microprocessor which has an instruction set architecture as is known in the art. The processor 216a can be configured to receive, output and process data, including image/pixel data, operate the imaging 202a and illumination 208a assemblies, and communicate with a system bus 238a, among other operations. Further, the processor 216a may be configured to control the illumination of the light source 212, the timing of the sensor 206, analog-to-digital conversion, transmission and reception of data to and from a processor of a remote computer or host server 236a external to the PDT 200a through a network interface 234a, such as an RS-232, RS-485, USB, Ethernet, Wi-Fi, Bluetooth™, IrDA or Zigbee interface, control a user input interface 230a to manage user interaction with a scan/trigger button 106 and/or keypad 108, and control an output device 104, such as an LCD or an OLED display, through the display interface 232a, among other functions as described in detail below. The processor 216a is configured to control the hardware and/or perform the above-identified functions, for example, by implementing instructions stored in the data storage means 222a, such as an imaging scan driver application program 225a, for example, and communicated by operating system(s) 223 and/or virtual machine monitor(s) and/or virtual machine(s) 224. The data storage means 222a can include local, network-accessible, removable and/or non-removable memory, such as RAM, ROM, and/or flash and can be further configured to store other software application program(s) 226a such as a bar code decode software application program configured to receive pixel data from the sensor and decode any bar code data encoded therein, for example. The imaging scan driver application program 225a is configured to provide software callable routines controlling devices such as by setting memory registers and supplying voltage to pins used to control the imaging assembly 202a and illumination assembly 208a hardware. For example, the imaging scan driver application program 225a can be configured to provide routines that turn illumination on or off, initiate image capture, retrieve an image, auto-detect the sensor, initialize the sensor, perform state management, and perform exposure control, for example.

The PDT 200a also includes one or more power supplies 228a, such as one or more batteries and/or circuitry for receiving an alternating current, and a user input interface 230a for receiving data from a user input device, such as a keyboard, keypad 108, trigger/scan button 106 and/or touch screen 104. The PDT 200a system components shown in FIG. 2a are preferably supported on one or more printed circuit boards (not shown).

Figure 2B:
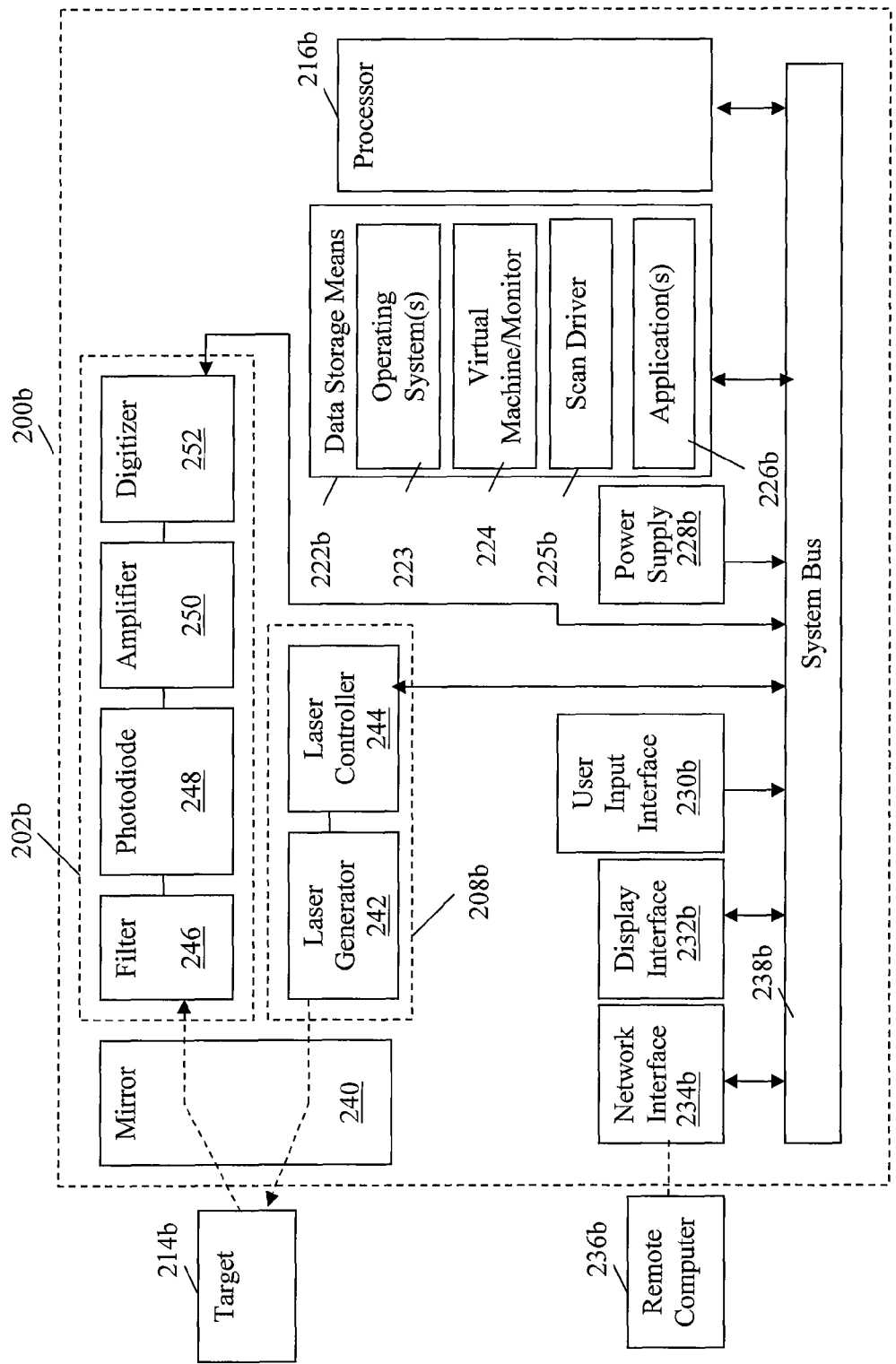

Referring to FIG. 2b, there is shown a block schematic diagram of the basic structures that together comprise a PDT 200b according to the present invention. The PDT 200b includes an illumination assembly 208b including at least one laser controller 244 for controlling at least one laser generator 242 for generating at least one laser beam directed onto at least one mirror 240, such as a folding mirror and/or an oscillating and/or rotating scan mirror, which then directs the beam onto a target 214b. The laser beam/scanning pattern is reflected off the target 214b and redirected by at least one mirror 240 into an imaging assembly 202b including one or more laser light pass filters 246, one or more photodiodes 248, an amplifier 250 and a digitizer 252, for example. Additional laser generators and laser controllers can be provided to provide laser light differing in shape, height, width, angle and/or distance, for example. The photodiode 248 converts incident light energy into electric charge that is an output signal representative of light reflected off the target 214b. Digitizer 252 converts an analog signal output by the photodiode 248 into a digital signal representative of the light reflected off of the target 214b.

Still referring to FIG. 2b, the PDT 200b further includes a processor 216b, such as a microprocessor, VLSI, ASIC and/or other integrated circuit microprocessor which has an instruction set architecture as is known in the art. The processor 216b can be configured to receive, output and process data, including image/pixel data, operate the illumination 208b and imaging 202b assemblies, and communicate with a system bus 238b, among other operations. Further, the processor 216b may be configured to control transmission and reception of data to and from a processor of a remote computer or host server 236b external to the PDT 200b through a network interface 234b, such as an RS-232, RS-485, USB, Ethernet, Wi-Fi, Bluetooth™, IrDA or Zigbee interface, control a user input interface 230b to manage user interaction with a scan/trigger button 106 and/or keypad 108, and control an output device 104, such as an LCD or an OLED display, through the display interface 232b, among other functions as described in detail below. The processor 216b is configured to control the hardware and/or perform the above-identified functions, for example, by implementing instructions stored in the data storage means 222b, such as a laser scan driver application program 225b, for example, and communicated by operating system(s) 223 and/or virtual machine monitor(s) and/or virtual machine(s) 224. The data storage means 222b can include local, network-accessible, removable and/or non-removable memory, such as RAM, ROM, and/or flash and can be further configured to store other software application program(s) 226b such as a bar code decode software application program configured to receive pixel data and decode any bar code data encoded therein, for example. The laser scan driver application program 225b is configured to provide software callable routines controlling devices such as by setting memory registers and supplying voltage to pins used to control the imaging assembly 202b hardware.

The PDT 200b also includes one or more power supplies 228b, such as one or more batteries and/or circuitry for receiving an alternating current, and a user input interface 230b for receiving data from a user input device, such as a keyboard, keypad 108, trigger/scan button 106 and/or touch screen 104. The PDT 200b system components shown in FIG. 2b are preferably supported on one or more printed circuit boards (not shown).

In order to provide a multiple platform PDT, two or more operating systems can be installed on separate hard disk drives, flash drives, such as NAND and/or NOR flash, or any other data storage means, and/or partitions in the data storage means, with the user selecting the operating system at boot time and wherein switching requires shutdown of the current operating system and startup of another operating system. Some of the several limitations of such an implementation are the time required to switch and the lack of context storage to provide resume functionality from the time of the switch. In order to provide multiple platforms and context switching without shutdown and startup routines, virtual machines have been utilized in the art, including in PDTs and embedded systems, as hardware, particularly processors, has become more robust. We describe below three embodiments of a multiple platform PDT system utilizing one or more improved virtualization techniques according to the present invention.

Virtual Machine Between PDT Hardware and Plurality of Platforms

Figure 3:
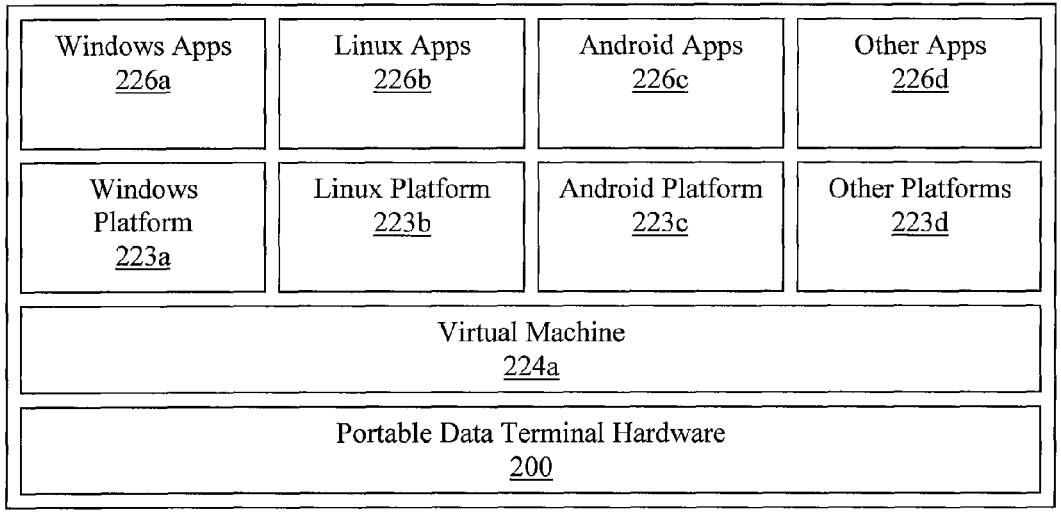
FIG. 3 is a block diagram of an exemplary portable data terminal according to the present invention and including a plurality of platforms and a virtual machine.

Referring to FIG. 3, one embodiment of the present invention is shown as including a virtual machine 224a, which can include a virtual machine monitor or hypervisor, configured to facilitate communication between the PDT hardware 200 and a plurality of platforms, operating systems, and/or kernels 223a-d such as Microsoft's Windows CE and/or Windows Mobile 223a, Google Inc.'s Android 223c, Oracle Corporation's Solaris, Unix, GNU, LiMO, Symbian, Red Hat Inc.'s Linux 223b, or those available from Apple, Inc. and/or Research In Motion Limited, and/or any other operating system. Exemplary virtual machines are the Mobile Virtualization Platform available from VMware, Inc., the VLX available from VirtualLogix, Inc and the OKL4 Microvisor and OK:Windows, OK:Linux and OK:Android products available from Open Kernal Labs. In the embodiment shown in FIG. 3, the virtual machine 224a is an application program contained in a data storage means, such as data storage means 222, for example, configured to receive instructions from a plurality of operating systems 223a-d and communicate instructions to the processor 216 according to the instruction set architecture of the processor 216. Exemplary processor 216 instruction set architectures include ARM v5 (ARM9 and XScale) and v6 (ARM11), MIPS (MIPS32 and MIPS64), and Intel (x86-32 and x86-64). The virtual machine 224a shares system resources 200, such as by means of a monitor, hypervisor, and/or scheduler, by assigning resources 200, such as the processor 216, to an operating system 223a-d. Resource control is managed by the scheduling policies of the virtual machine monitor or the scheduling policies of the operating system(s) 223a-d, for example.

Still referring to FIG. 3, in order to provide direct user management of operating system 223a-d control of system resource(s) 200, and specifically a processor 216, in one embodiment of the present invention, the virtual machine 224a is configured to switch operating system 223a-d access upon receipt of an electrical signal representing an event. The electrical signal can be communicated based on user interaction with one or more of a trigger 106, button, keypad 108, and/or touch screen 104, for example. The virtual machine 224a can be configured to switch operating system 223a-d access by prioritizing one operating system 223a-d or by prioritizing instructions, processes, and/or threads issued by one operating system 223a-d over one or more other operating system 223a-d. One exemplary embodiment of such a scheduler, configured to provide flexible operating system priority, is disclosed in U.S. patent application Ser. No. 12/376,822 entitled "Fine Grain OS Scheduling," incorporated herein by reference. In a preferred embodiment, the virtual machine 224a is configured to switch operating system 223a-d access to system resources 200 by suspending the current operating system, such as by an interrupt routine and instantiation of a sleep, idle, hibernate, and/or other suspend utility, as provided by the operating system architecture, for example, and wake another operating system based on user input, predetermined order, or, preferably, by reinstating control of the processor 216, or other system resource 200, to the last operating system to have control prior to the switch. An exemplary implementation of suspend utility operation is described in U.S. Pat. No. 7,356,677 entitled "Computer System Capable of Fast Switching Between Multiple Operating Systems and Applications," incorporated by reference herein. In embodiments in which the operating system does not have a native suspend utility, the virtual machine 224a is configured to save the context in data storage means including the program counter, process control block(s), and/or memory/register, memory map, table, and/or list value(s) such that the operating system losing control can resume control, as directed by the user, by reversing the context switch.

Still referring to FIG. 3, in one exemplary embodiment of a PDT 200 according to the present invention the Windows application(s) 226a include at least a scan driver application program 225 configured to communicate with the Windows Mobile operating system 223a to control imaging 202 and illumination 208 assemblies so as to acquire, and optionally decode, an image of a target 214, such as a bar code. Specifically, when invoked, the scan driver application program 225 is compiled producing a file containing binary information in a Windows-specific format that is then interpreted by the Windows Mobile operating system 223a and used to determine the respective instructions. Although described with respect to a scan driver application program 225 in a Windows format, in other embodiments, one or more of the Linux application(s) 226b, Android application(s) 226c, or any other application(s) 226d includes a scan driver application program 225 configured to communicate with the respective operating system.

Accordingly, the PDT 200 is configured to, upon user interaction with a button, such as a keypad 108 button, switch, and/or touchscreen 104, for example, switch between any two or more of operating systems 223a-d, as described above, initiate the scan driver application program 225, optionally by compiling the high level code to produce a binary file, communicate instructions to the virtual machine 224a based on the information contained in the binary file, and cause the virtual machine 224a to translate the instructions, if necessary, or otherwise communicate the instructions to the processor 216 according to the instruction set architecture of the processor 216. Thereafter, in one embodiment, the virtual machine 224a is configured to maintain control of the processor 216 with the operating system 223a-d with which the scan driver application program 225 is configured to communicate until another event such as user interaction with a keypad 108 button or subsequent interaction with the trigger 106, for example.

In another embodiment, the PDT 200 is configured to switch between any of two or more operating systems 223a-d based on a trigger 106 press producing an electrical signal indicating a bar code scan attempt event. Accordingly, in this embodiment, upon user interaction with a trigger 106, for example, a scan driver application program 225 is instantiated. The scan driver application program 225 can be configured to communicate with one of operating systems 223a-d and, therefore, upon trigger 106 press, the virtual machine 224a is configured to switch operating systems 223a-d, as described above, to that operating system 223a-d with which the scan driver application program 225 is configured to communicate. The scan driver application program 225 can be further configured to communicate completion of a bar code scan attempt to the virtual machine 224a which can be configured to switch operating systems 223a-d back to the operating system 223a-d that had control prior to the scan attempt and/or to any other operating system 223a-d.

In yet another embodiment, the virtual machine 224a is configured to switch operating system 223a-d control of one or more system resources 200 based on a successful bar code decode attempt event. In this embodiment, the scan driver application program 225 is further configured to include, or automatically instantiate a separate software application program(s) including, program instructions configured to decode any bar code data encoded in the pixel data retrieved from the sensor 206. Accordingly, the scan driver application program 225 is configured to communicate success and/or failure of the bar code decode attempt to the virtual machine 224a. The virtual machine 224a is configured to switch control of one or more system resources 200, such as processor 216, as described above, to another operating system 223a-d upon successful bar code decode operation.

In yet another embodiment, the virtual machine 224a is configured to switch operating system 223a-d control of one or more system resources 200 based on the data encoded in any bar code contained in the pixel data communicated by the sensor 206. In this embodiment, the scan driver application program 225 is further configured to include, or automatically instantiate a separate software application program(s) including, program instructions configured to decode any bar code data encoded in the pixel data retrieved from the sensor 206. Accordingly, the imaging scan driver application program 225 is configured to communicate information and/or value(s), representing the data encoded in the scanned bar code, to the virtual machine 224a which interprets the information to determine whether the value matches a preset switch information value indicating an operating system 223a-d switch. The preset value(s) can be stored in the data storage means 222 by the manufacturer or may be entered by the user such as by interaction with the keypad 108 and as interpreted by the user input interface and stored in the data storage means.

Virtual Machine(s) Between Host Operating System and Guest Operating System(s)

Figure 4:
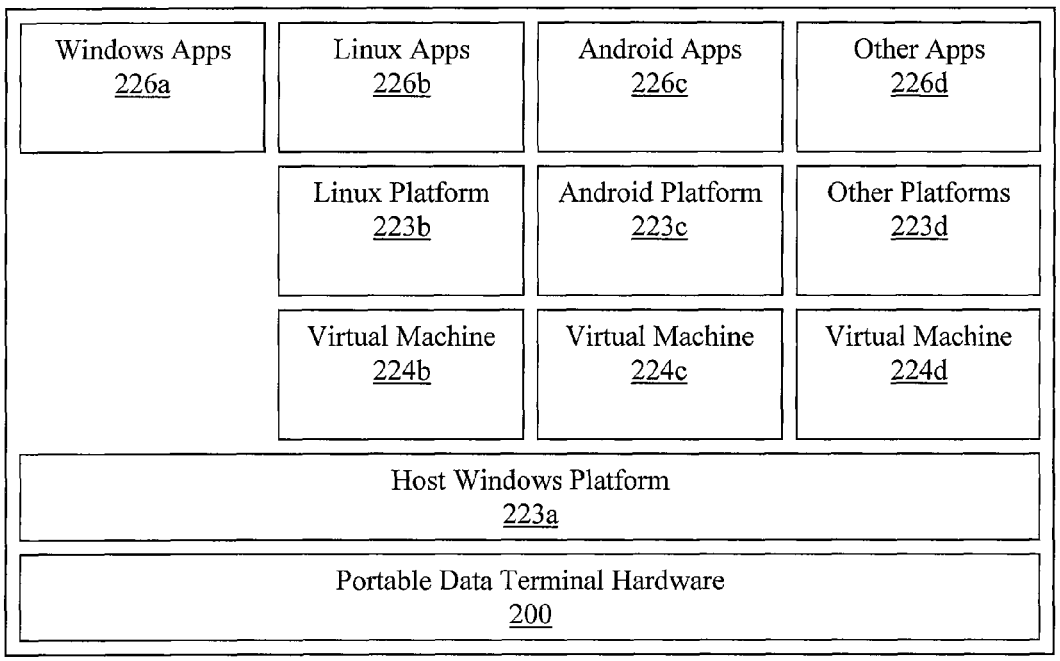
FIG. 4 is a block diagram of an exemplary portable data terminal according to the present invention and including a host platform, a plurality of virtual machines and a plurality of respective platforms.

Referring to FIG. 4, a virtual machine 224b-d is shown as configured to receive instructions from a guest operating system 223b-d, such as a Linux operating system 223b, Android operating system 223c, or any other operating system 223d, as communicated by application(s) 226b-d, and communicate instructions, as translated, if necessary, to the host operating system 223a, such as Windows Mobile, so as to communicate with PDT hardware system resources 200. The instructions communicated by the virtual machine 224b to the host operating system 223a correspond to the instruction set architecture of the PDT hardware 200 and processor 216. In this implementation, each virtual machine 224b-d runs on top of the host operating system 223a as a container for one or more guest operating systems 223b-d and associated application(s) 226b-d.

Still referring to FIG. 4, in order to provide direct user management of operating system 223a-d control of system resource(s) 200, and specifically a processor 216, in one embodiment of the present invention, virtual machine 224b-d access to system resources 200, through communication with the host Windows operating system 223a, is determined by receipt of an electrical signal representing user interaction with a user interface device such as one or more of a button, keypad 108, and/or touch screen 104, for example. User interaction with a user interface device causes the PDT 200 to instantiate the indicated virtual machine 224b-d, if the indicated virtual machine 224b-d is not already running. The virtual machine can be indicated by a predetermined order of successive interaction with the same interface device or, alternatively, separate interface devices can be provided indicating a switch to a respective operating system 223b-d. Once the virtual machine 224b-d, and associated operating system 223b-d, is running, or if the indicated virtual machine 224b-d was already running, subsequent user interaction with the PDT 200 is interpreted by the operating system 223b-d which communicates instructions to the respective virtual machine 224b-d which translates the instructions and communicates the translated instructions to the host Windows operating system 223a which then communicates with the processor 216 based on its instruction set architecture. As the virtual machines 224b-d are programs that run on top of the host Windows operating system 223a, the context can be switched, and/or threads or processes prioritized, as indicated by the user's interaction with the user interface device, just as any other application program can be switched when operating on a Windows operating system. In one embodiment, upon instantiation and/or switching to a virtual machine 224b, the Windows operating system 223a can be configured to communicate with the display interface 232 to cause the display 104 to indicate which virtual machine 224b-d/operating system 223b-d is currently communicating with the Windows operating system 223 to control one or more system resources 200.

In another exemplary embodiment of the present invention as shown in FIG. 4, Windows application(s) 226a includes a scan driver application program 225. Scan driver application programs configured to communicate with a Linux 223b, Android 223c, or any other operating system 223d are also contemplated. In this embodiment, control of system resources 200 can be switched from the virtual machine(s) 224b-d to the host Windows operating system 223a upon user interaction with a trigger/scan button 106 indicating bar code decode attempt, for example, such that the scan driver application program 225 is instantiated. In other embodiments, control of system resources 200 can be switched from the virtual machine(2) 224b-d to the host Windows operating system 223a, upon bar code decode attempt, successful bar code decode, and/or based on the information/value(s) encoded in any bar code contained in the captured pixel data. Operating system control can be returned to the virtual machine 224b-d operating prior to the switch to the host Windows operating system 223a, or, another other virtual machine 224b-d, by any one or more of the methods described above. Although this exemplary embodiment has been described with respect to a host Windows operating system and associated scan driver application program 225, any operating system can be the host operating system, all permutations of virtual machines and associated operating systems are contemplated, the scan driver application program 225 can be configured to communicate with the host operating system or, the scan driver application program 225 can be one or more of applications 226b-d.

Virtual Machine(s) Between Host Operating System and Guest Applications

Figure 5:
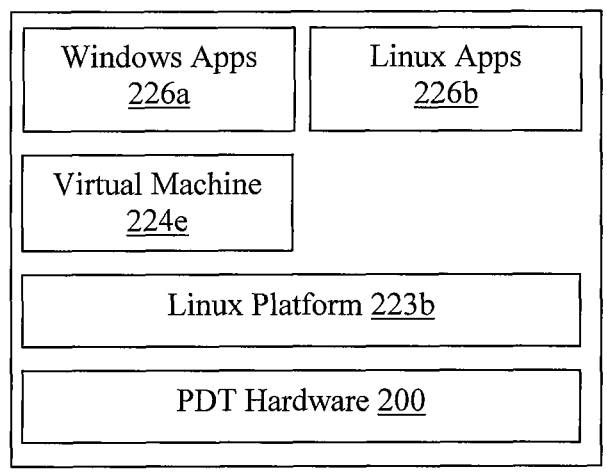
FIG. 5 is a block diagram of an exemplary portable data terminal according to the present invention including a host platform and a virtual machine.

Referring to FIG. 5, an exemplary embodiment of the present invention is shown as including data storage means 222 configured to store a first operating system, such as a Linux host operating system 223b, for example, configured to communicate with a processor 216 having an ARM instruction set architecture, for example, a first application program such as Windows application program 226a, such as a scan driver application program 225, for example, configured to communicate instructions in a format understandable by a second operating system (not installed) such as a Windows platform 223a, and a virtual machine application 224e configured to receive the instructions and communicate with an imaging assembly 202 and illumination assembly 208 according to the instructions so as to acquire pixel data representing an image of a target 214. In this embodiment, Linux application programs 226b communicate directly with the Linux operating system 223b but Windows application programs 225, 226a communicate with the Linux operating system 223b through the virtual machine 224e. Alternative PDT 200 embodiments including other and/or additional host operating systems 223, virtual machines 224, and application programs 226 are contemplated.

Accordingly, the exemplary PDT 200 of FIG. 5 is configured to, upon user interaction with a keypad 108 button and/or trigger 106, communicate the resulting electrical signal to the host Linux operating system 223b where it is interpreted as a command to instantiate the virtual machine 224e which is configured to automatically instantiate the scan driver application program 225 which is compiled and the Windows formatted output is interpreted by the virtual machine 224e, translated and communicated to the Linux host operating system 223b which thereby operates the imaging assemblies of the PDT hardware 200. Control of system resources 200 can be switched from the virtual machine 224e, such as by prioritizing instructions, processes, and/or threads relating to applications 226b, as described above, or otherwise idling/suspending virtual machine 224e, upon subsequent user interaction with a keypad 108 button and/or trigger 106, completion of a bar code decode attempt, successful bar code decode, and/or based on information/value(s) encoded in any scanned bar code.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A terminal, comprising:
    a processor having an instruction set architecture;
    an imaging assembly; and
    data storage means configured to store:
        a plurality of operating systems;
        a virtual machine application program configured to receive at least one instruction from each operating system, communicate with the processor according to the instruction set architecture, and switch operating system access to the processor upon receipt of an electrical signal representing an event;
        a decoder application program; and
        a scan driver application program configured to communicate with the imaging assembly, illumination assembly, virtual machine application program, and the decoder application program;
    wherein the event comprises the scan driver application communicating an electrical signal representing data encoded in a barcode decoded by the decoder application program from an image captured by the imaging assembly to the virtual machine application program.

2. The terminal of claim 1, wherein the virtual machine application program is configured to interpret the electrical signal representing data encoded in a barcode to determine whether the value matches a preset switch information value indicating an operating system switch.

3. The terminal of claim 2, wherein the data storage means is configured to store the preset switch information value.

4. The terminal of claim 1, wherein the imaging assembly comprises imaging optics and an image sensor.

5. The terminal of claim 1, comprising an illumination assembly comprising illumination optics and a light source.

6. The terminal of claim 1, comprising:
    a mirror; and
    an illumination assembly comprising a laser generator and a laser controller;
    wherein the imaging assembly comprises a filter, a photodiode, an amplifier, and a digitizer.

7. The terminal of claim 1, wherein the event comprises a successful decode operation by the scan driver application program.

8. The terminal of claim 1, wherein the virtual machine application program comprises a scheduler configured to assign priority to processes.

9. A portable data terminal, comprising:
    a user interface device;
    a processor having an instruction set architecture;
    data storage means configured to store:
        a first operating system configured to communicate with the processor according to the instruction set architecture;
        a first application program configured to communicate with the first operating system;
        a second operating system;
        a second application program configured to communicate with the second operating system; and
        a virtual machine application program configured to receive an instruction from the second operating system and communicate with the first operating system based on the instruction;
    wherein the portable data terminal is configured to switch operating systems upon user interaction with the user interface device and/or in response to data encoded in a barcode decoded by the portable data terminal.

10. The portable data terminal of claim 9, comprising:
an imaging assembly; and
an illumination assembly;
wherein the first application program comprises a scan driver application program configured to communicate with the imaging assembly, the illumination assembly, and a decoder application program configured to interpret pixel data transmitted by the imaging assembly to decode any barcode contained therein.

11. The portable data terminal of claim 9, comprising:
an imaging assembly comprising imaging optics and an image sensor; and
an illumination assembly comprising illumination optics and a light source.

12. The portable data terminal of claim 9, comprising:
a mirror;
an imaging assembly comprising a filter and a photodiode; and
an illumination assembly comprising a laser generator and a laser controller.

13. The portable data terminal of claim 9, wherein:
the user interface device comprises a scan button;
the data storage means is configured to store switch information; and
the portable data terminal is configured to:
  attempt to decode a barcode in response to user interaction with the scan button;
  determine whether the data encoded in the decoded barcode matches the stored switch information; and
  switch operating systems if the data encoded in the decoded barcode matches the stored switch information.

14. The portable data terminal of claim 9, comprising:
an imaging assembly; and
an illumination assembly;
wherein the first application program comprises a scan driver application program configured to communicate with the imaging assembly, the illumination assembly, and a decoder application program configured to interpret pixel data transmitted by the imaging assembly to decode any barcode contained therein; and
wherein the first operating system is configured to suspend the virtual machine application program upon one of a barcode decode attempt operation of the decoder application program or a successful barcode decode operation of the decoder application program.

15. A portable data terminal, comprising:
a user interface device;
a processor having an instruction set architecture;
data storage means configured to store:
  a first operating system configured to communicate with the processor according to the instruction set architecture;
  a first application program configured to communicate with the first operating system;
  a second application program; and
  a virtual machine application program configured to receive an instruction from the second application program and communicate with the first operating system based on the instruction; and
wherein the portable data terminal is configured to invoke the virtual machine application program in response to data encoded in a barcode decoded by the portable data terminal.

16. The portable data terminal of claim 15, comprising:
an imaging assembly; and
an illumination assembly;
wherein the first application program comprises a scan driver application program configured to communicate with the imaging assembly, the illumination assembly, and a decoder application program configured to interpret pixel data transmitted by the imaging assembly to decode any barcode contained therein.

17. The portable data terminal of claim 15, comprising:
an imaging assembly comprising imaging optics and an image sensor; and
an illumination assembly comprising illumination optics and a light source.

18. The portable data terminal of claim 15, comprising:
a mirror;
an imaging assembly comprising a filter and a photodiode; and
an illumination assembly comprising a laser generator and a laser controller.

19. The portable data terminal of claim 15, wherein:
the user interface device comprises a scan button;
the data storage means is configured to store switch information; and
the portable data terminal is configured to:
  attempt to decode a barcode in response to user interaction with the scan button;
  determine whether the data encoded in the decoded barcode matches the stored switch information; and
  switch operating systems if the data encoded in the decoded barcode matches the stored switch information.

20. The portable data terminal of claim 15, comprising:
an imaging assembly; and
an illumination assembly;
wherein the first application program comprises a scan driver application program configured to communicate with the imaging assembly, the illumination assembly, and a decoder application program configured to interpret pixel data transmitted by the imaging assembly to decode any barcode contained therein; and
wherein the first operating system is configured to suspend the virtual machine application program upon one of a barcode decode attempt operation of the decoder application program or a successful barcode decode operation of the decoder application program.

\* \* \* \* \*